Jan. 23, 1934. P. P. BOEHMER 1,944,632
COOKER
Filed July 23, 1931
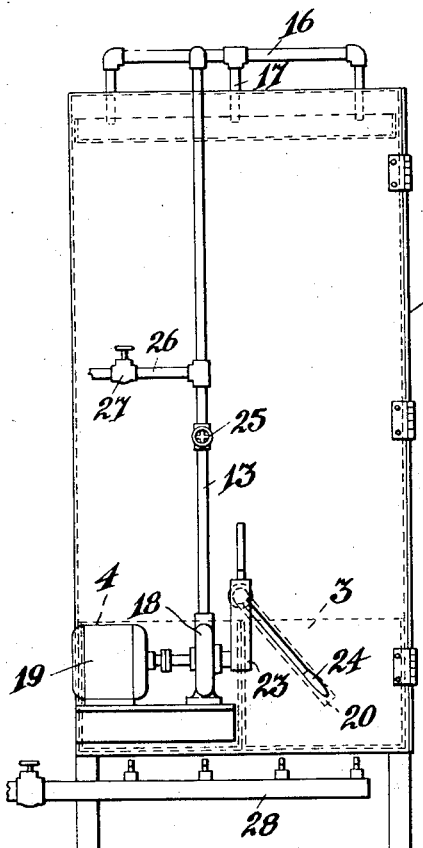
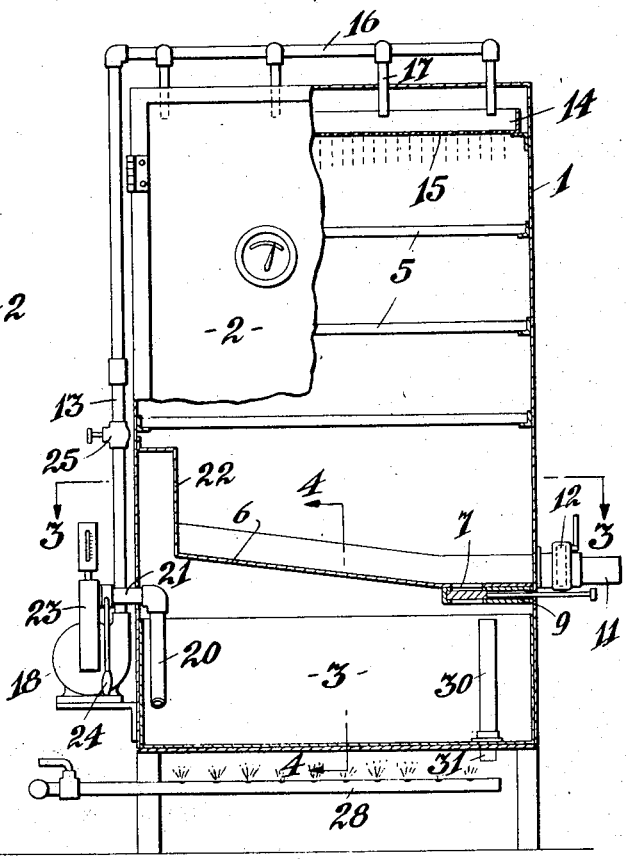
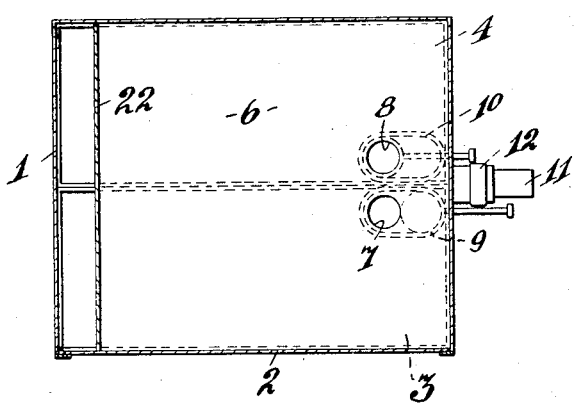
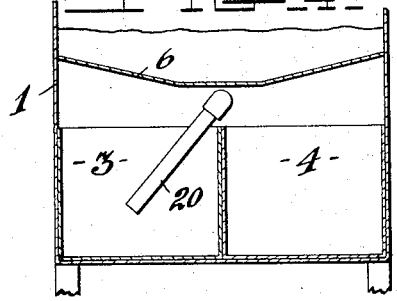
INVENTOR
Peter P. Boehmer,
BY
Bodell & Thompson
ATTORNEYS.

Patented Jan. 23, 1934

1,944,632

UNITED STATES PATENT OFFICE 1,944,632

COOKER

Peter P. Boehmer, Syracuse, N. Y.

Application July 23, 1931. Serial No. 552,742

2 Claims. (Cl. 99—2)

This invention has for its object a cooker for cooking meats, meat products and the like, such as frankfurters, and has for its object a cooker which is particularly simple in construction, rapid in operation, and in which various cooking fluids or waters used during the cooking operations do not become mixed.

This invention consists in the novel features and in the combinations and constructions hereinafter set forth and claimed.

In describing this invention, reference is had to the accompanying drawing in which like characters designate corresponding parts in all the views.

Figure 1 is a side elevation of a cooker embodying my invention.

Figure 2 is a front elevation, partly in section.

Figure 3 is a sectional view on the plane of line 3—3, Figure 2.

Figure 4 is a sectional view on the plane of line 4—4, Figure 2.

In cooking meats or meat products, such as frankfurters, the frankfurters are, after being made, hung on suitable racks or bars and smoked, the time of the smoking depending on the meat product being treated. Then the racks or bars with the frankfurters hung thereon are taken to the cooker and during the latter part of the cooking operation, the frankfurters are colored and thereafter cooled. The coloring matter which is carried by the hot water adheres to the supply tank, and there is coloring matter present during certain cooking operations, during which no coloring matter is intended to be used. It is impossible to remove the coloring matter entirely from the tank, pipes, pump, etc. However, it is important that the frankfurters be colored to a certain degree and not overcolored.

One of the objects of this invention is a cooker in which the coloring fluid is kept separate from other fluids used during the cooking operation. This cooker comprises, generally, a cabinet, in which the articles to be cooked are placed or hung, a plurality of supply tanks for cooking fluids, conduit means for circulating the fluids interchangeably from the tanks to the upper portion of the cabinet and means by which the particular fluid used is drained into its own tank or drained to a point outside the cabinet, or discharged into a sewer. During the smoking process meat products acquire a film of grease which must be first removed before the products can be colored. Another object of this invention is to provide a cooker by which this film of grease can be readily removed from the meat products before the cooking or coloring operation and which removed grease will not collect in the cooking apparatus.

1 designates the cabinet which may be of any suitable size or construction, it being here shown in the form of an upright box having a door 2 on its front side, coextensive with the entire front side. 3 and 4 are tanks located in the bottom of the cabinet and removable and replaceable through the door opening, these tanks being usually opened at their tops. One of these tanks is for hot water to be circulated over these articles, or frankfurters, and the other for hot water with coloring matter.

5 designates the bars or racks mountable in the cabinet through the door thereof and on which the articles to be cooked are hung. 6 designates a drain pan located in the cabinet above the tanks and having drain openings 7 and 8 leading into the tanks 3 and 4, respectively, these openings 7 and 8 being controlled by suitable manually operated valves 9 and 10, which are operable independently of each other.

11 is a drain pipe having a suitable valve therein leading from the pan for discharging into a pan or sewer, or to any other point outside of the cabinet and having a manually operated valve 12 therein. 13 is a conduit, interchangeably connectable with either of the tanks 3, 4, and for discharging into the upper portion of the cabinet into a receptacle 14 having a perforated bottom 15, the conduit 13 being connected to a header 16 located above the cabinet and having outlet pipes 17 into the pan 14 to maintain a head of cooking water therein.

The water is circulated by means of a suitable pump 18, actuated by a motor 19, the intake side of the pump having a pipe 20 interchangeably shiftable into communication with either of the tanks 3 and 4. The pipe 20 is here shown as angular and having a horizontal portion 21 mounted to shift about a horizontal axis to carry the ends of the pipe 20 into either of the tanks 3, 4.

In order to permit the pipe 20 to swing over from either tank to the other, the pan 6 is provided with an upward hollow extension 22. The horizontal part of the pipe 21 is connected to an upright pipe section 23 adjacent to the pump 18, and is also provided with a suitable handle 24, by means of which it can be turned to carry the intake end of the pipe 20 into either of the tanks 3 and 4. The pipe 13 is provided with a suitable cutoff valve 25 therein, and is also connected between the valve 25 and the header 16 to a cold water pipe 26 having a cutoff valve 27 therein, the cold water being used to wash and cool the frankfurters, or other articles, after the cooking and coloring operations.

The cooker is heated by suitable gas burners or other means 28, located below the bottom thereof, in position to heat the tanks 3, 4. Each of the tanks 3, 4 is provided with an overflow pipe 30 intended to remove and carry off the grease that floats on the surface of the water, which grease is washed off from the frankfurters or other articles. These overflow pipes 30 have extensions 31 extending through the bottom of the cabinet, where they communicate with drain pipes not shown. In removing the tanks, it is necessary to lift the front ends slightly to carry the extension 31 free of the bottom of the cabinet.

In operation, the burners are lighted to heat the water in the tanks; the racks 5, with the frankfurters thereon are placed in the cooker and the intake pipe 20 shifted by means of the handle 24, so that it communicates with the water tank 4. The pump 18 is then started, and the hot water passes through the pipe 13, header 16, into the pan 14, from which it drips through the perforated bottom over the articles on the racks 5, to the pan 6. During this operation, the valve 9 is closed and the valve 10 opened, so that the water drains from the pan into drain passage 8, back into the tank 4, and is recirculated.

At the end of this operation, both valves 9 and 10 may be closed and the valve 12 opened to permit the water to run out into the sewer through the drain 11.

After cooking for a predetermined period, with the water from tank 4, the intake pipe 20 is shifted by means of the handle 24 into the tank containing hot water and coloring matter, the valve 9 is opened, and valve 10 closed, so that now the hot water with the coloring matter is circulated through the pipe 13, header 16, receptacle 14, through which it then runs or drips over the articles on the racks 5; thence to the pan 6 through the drain passage 7, back into the tank 3 from which it is recirculated.

At the end of this operation, if desired, valves 9 and 10 may be closed and the valve 12 in the drain pipe opened. At any time, the tanks 3, 4 can be removed by swinging the intake pipe 20 upwardly and removing the tanks through the open door.

After the cooking and coloring operations, the valve 25 is closed and the cold water valve 27 is opened, permitting cold water to wash over the frankfurters or other articles, to wash and cool them and during this operation the valves 9 and 10 are closed and the valve 12 opened.

This cooker is particularly rapid in operation and the articles are cooked evenly owing to the dripping of the water from the receptacle 14 as distinguished from a forcible spraying or drenching operation. Also, the coloring matter is confined to its own tank and does not in any manner interfere with the use of clear hot water as a cooking medium. After the meat products have been cooked with the coloring liquid the pipe 20 is swung into horizontal position with its open end near the front edge of the tank 3. The door 2 and the valve 27 are opened thereby passing a stream of clear water through the open valve 25, pipe 13, pump 18, pipe 21, pipe 20 and these parts are accordingly flushed with the water passing over the front edge of the tank 3 and being discharged through a drain in the floor or other suitable means. The valve 25 is then closed together with the valves 7, 8 and the valve 12 is opened. This permits flushing of the header 16 and pipes 17 and tray 14, the waste water passing out through the valve 12. In this way, the cooker and all associated parts are readily freed from all traces of coloring matter.

When the meat products are brought from the smoking chamber in greasy condition, the valves 7, 8 are closed, the pipe 20 swung into the tank containing the hot water, the pump started and the meat products are drenched with the hot water, the greasy waste water passing through the vent open valve 12, whereby none of the greasy water is allowed to collect in either of the tanks 3, 4.

What I claim is:

1. In a cooker, the combination of a cabinet having a door in the front side thereof, a plurality of tanks mounted in the lower portion of the cabinet, and removable and replaceable when the door is opened, a pan in the cabinet above the tanks and having valve controlled drain passages into the tanks respectively, and also having an additional valve controlled drain pipe for discharging to a point outside of the cabinet, conduit means for discharging cooking fluid into the upper portion of the cabinet and means by which the former means may be interchangeably connected to either of the tanks.

2. In a cooker, the combination of a cabinet having a door in one side thereof to permit articles to be cooked to be placed in and taken from the cabinet, a purality of tanks mounted in the lower portion of the cabinet, said tanks being adapted to contain different cooking fluids, a pan located in the cabinet above the tanks and having valve controlled drain passages into the tanks respectively, and also having an additional valve controlled drain pipe for discharging at a point outside of the cabinet, conduit means for discharging cooking fluid into the upper portion of the cabinet, and means by which the former means may be interchangeably connected to either of the tanks.

PETER P. BOEHMER.